May 14, 1968  A. B. MOJONNIER  3,383,260
METHOD AND APPARATUS FOR HEAT SEALING CONTAINERS
Filed April 26, 1965
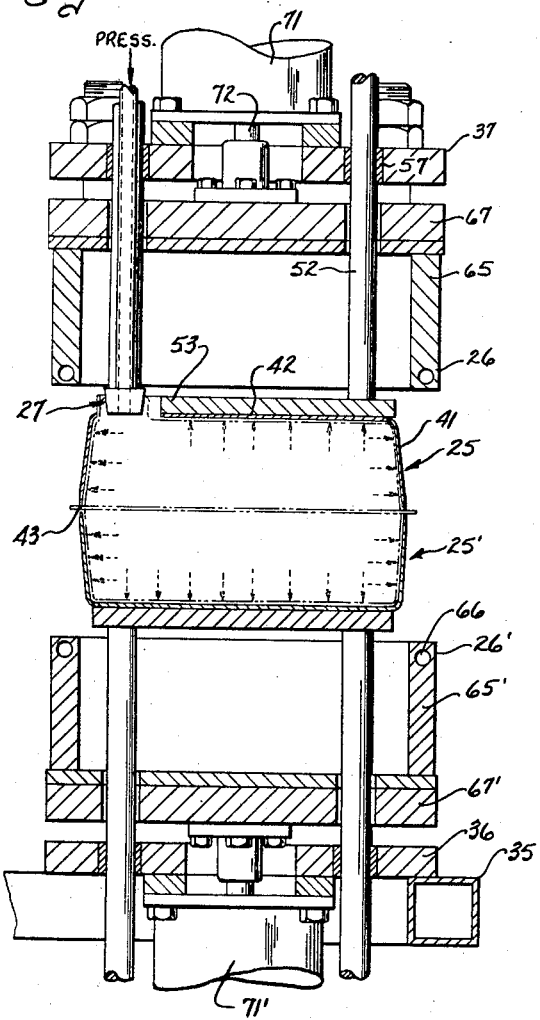
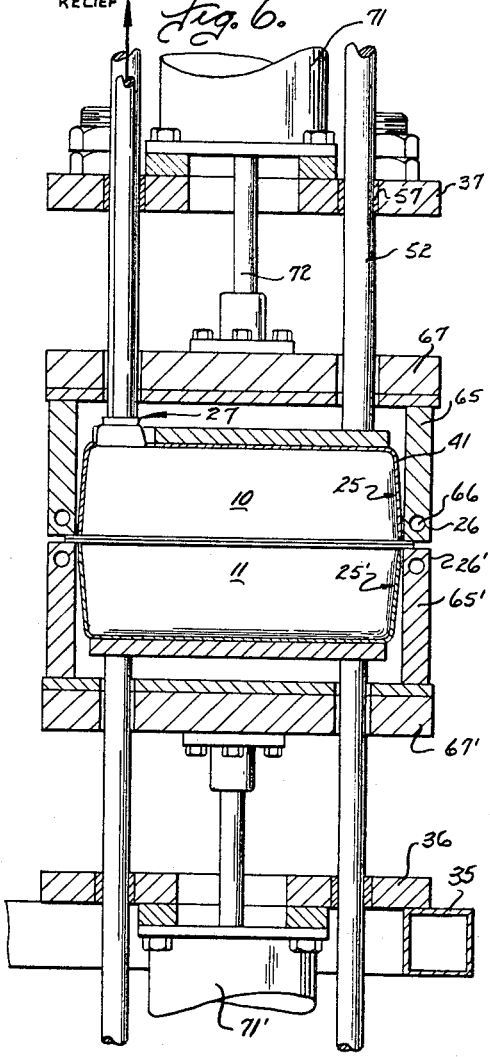
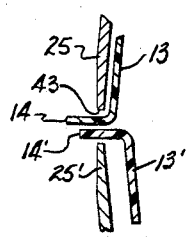
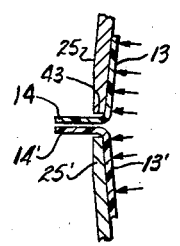
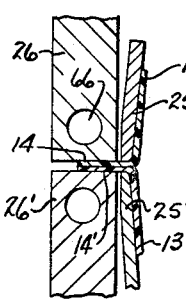
Inventor
Albert B. Mojonnier
By
McCanna, Morsbach & Pillote
Attorneys

United States Patent Office 3,383,260
Patented May 14, 1968

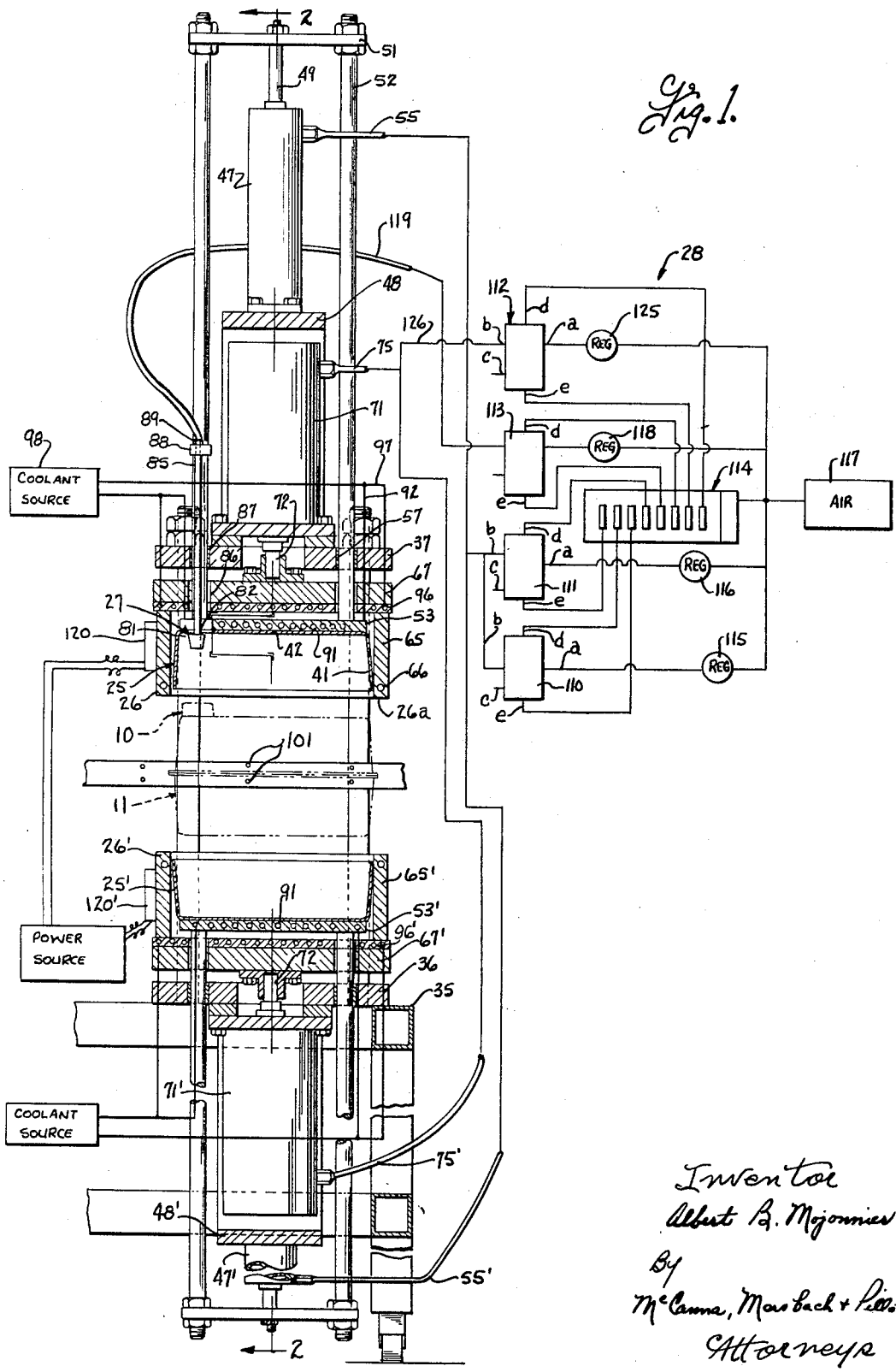

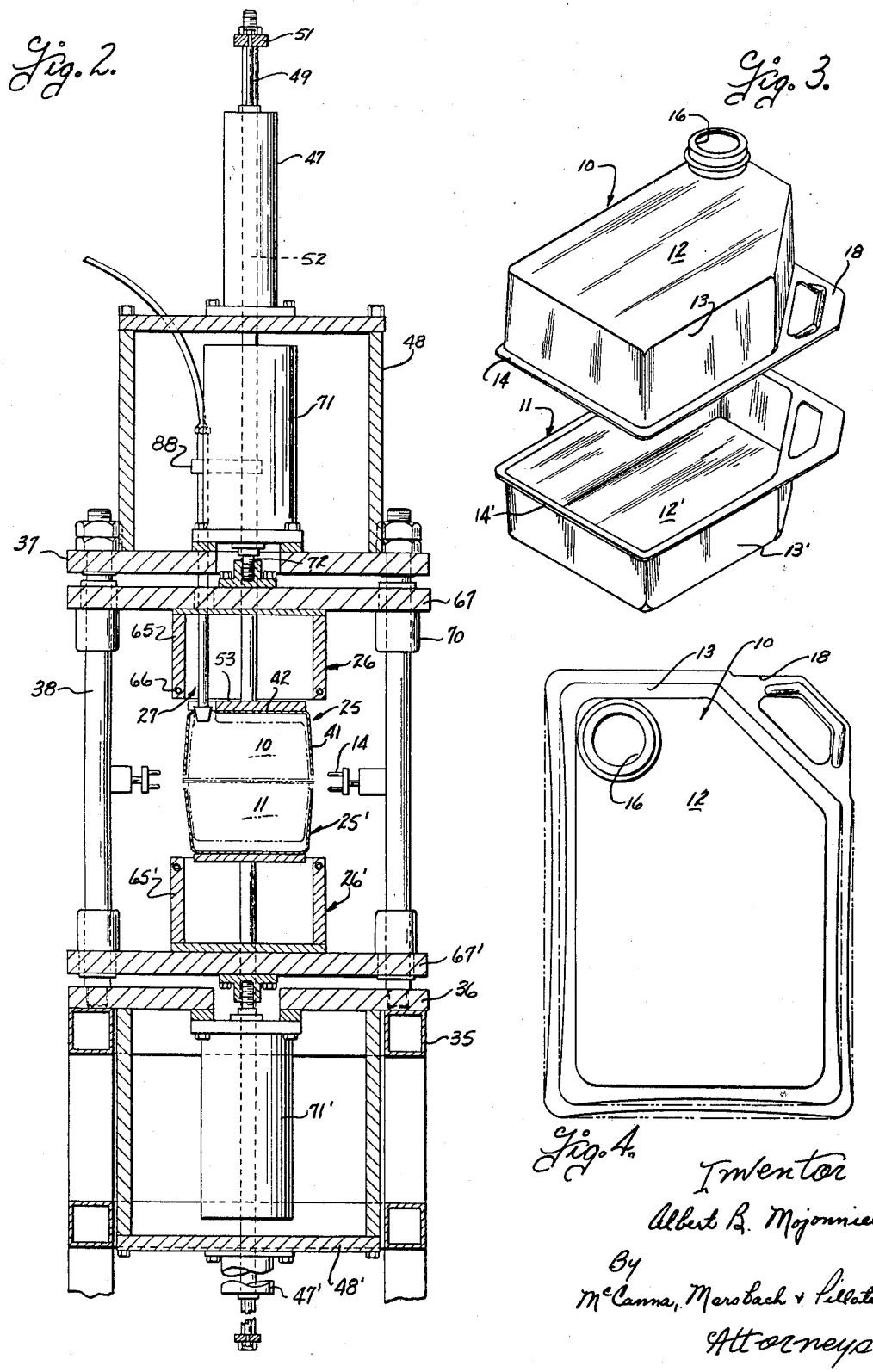

3,383,260
METHOD AND APPARATUS FOR HEAT SEALING CONTAINERS
Albert B. Mojonnier, Chicago, Ill., assignor to Albert Mojonnier Inc., Franklin Park, Ill., a corporation of Illinois
Filed Apr. 26, 1965, Ser. No. 450,851
12 Claims. (Cl. 156—156)

ABSTRACT OF THE DISCLOSURE

A method and apparatus for joining preformed flanged shells of thermoplastic material to accommodate any distortion in the size and shape of the shells and the plane of the mating flanges. The flanges on the opposing shells are brought into contact to substantially close the open ends of the shells, and fluid under pressure is introduced into the shells to press the sides outwardly until they engage shell confining members to thereby equalize the size and shape of the shells. The flanges are then firmly clamped together to hold the shells in the reshaped condition, and the flanges then heat sealed together. The pressure in the shells is relieved before the flanges are heat softened to prevent blow-out through the heat softened flange.

---

This invention relates to a method and apparatus for heat sealing thermoplastic articles.

The method and apparatus of the present invention is particularly adapted for joining preformed thermoplastic bodies having mating flange portions to form hollow containers. The preformed bodies are generally formed from sheets of thermoplastic material which is shaped, as by drawing between mating dies; by drape forming or by pressure or by vacuum forming. Such preformed thermoplastic bodies have an "elastic memory" which tends to cause the bodies to shrink and distort after forming and during the subsequent cooling and handling of the bodies. This distortion causes variation in size and shape of the thermoplastic bodies and, moreover, frequently causes distortion in the plane of the flange portions. The amount and character of the distortion in the bodies varies widely depending upon numerous factors including the initial stresses in the flat sheet from which the body is formed; the temperature at which the body is formed, the rate and manner of cooling the body, and the handling of the bodies particularly during the cooling stage. As a result of this distortion, considerable difficulty has been encountered in achieving proper registry of the flanges on mating thermoplastic bodies during assembly of the same.

The flanges on the thermoplastic bodies are preferably joined by heat sealing and this presents additional problems. Due in large part to the aforementioned elastic memory of the thermoplastic material, the preformed bodies tend to further distort and shrink back to their original flat shape, if subjected to heat as may occur during heat sealing of the flanges. Further, the initial stresses in the preformed bodies are frequently sufficient to cause the mating heat sealed flanges to creep or even pull apart, while the joint is still in a heat softened condition.

An important object of this invention is to provide an improved method and apparatus for joining preformed cup-shaped bodies of thin thermoplastic material along mating peripheral flanges and which assures proper registry and alignment of the flanges independent of whether the preformed bodies are initially deformed or distorted.

Another object of this invention is to provide an improved method and apparatus for joining preformed bodies of thermoplastic material along mating flanges and which is adapted to accommodate the various different forms of distortion which normally occur in such preformed cup-like bodies including variations in the size or shape of the cup-like bodies or deviations in the plane of the mating flanges.

Another object of this invention is to provide a method and apparatus for assembling distorted or deformed preformed cup-shaped bodies which assures proper registry of the mating flanges thereon and reliable heat sealing of the flanges without causing heat distortion of the bodies during heat sealing.

A further object of this invention is to provide a method and apparatus for heat sealing preformed cup-shaped bodies along mating flanges and which inhibits creeping or separation of the heat softened flanges during heat sealing of the same due to stresses in the preformed bodies.

Still another object of this invention is to provide an apparatus for heat sealing preformed thermoplastic bodies along mating peripheral flanges and which provides a strong resilient joint between the flanges without requiring accurate control of the temperatures, pressures or sealing time used in performing the heat seal.

Yet, another object of this invention is to provide a method and apparatus adapted for heat sealing preformed thermoplastic bodies which will not significantly increase the overall time required to complete the cycle for joining the preformed bodies.

These, together with other objects and advantages of this invention will be more readily appreciated as the same becomes better understood by reference to the following detailed description when taken in connection with the accompanying drawings wherein:

FIGURE 1 is a view shown partially in section and partially diagrammatically, of an apparatus for performing the method of the present invention;

FIG. 2 is a sectional view through the apparatus taken on the plane 2—2 of FIG. 1;

FIG. 3 is an exploded perspective view of a pair of cup-like bodies of the type adapted to be sealed by the method and apparatus of the present invention;

FIG. 4 is a plan view of one of the cup-like bodies and illustrating one form of distortion which frequently occurs in preformed articles of this type;

FIGS. 5 and 6 are sectional views on a larger scale than FIG. 1 and illustrating the apparatus in different moved positions incident to the joining of the thermoplastic bodies; and FIGS. 7, 8 and 9 are fragmentary views on an enlarged scale, illustrating different steps in the joining and heat sealing of the mating flanges on the thermoplastic bodies.

The method and apparatus of the present invention is generally adapted for joining preformed cup-shaped bodies formed of various different thermoplastic materials and may, for example, be employed to join bodies formed of polystyrene, polyethylene, polyvinylchloride, polypropylene, etc., by suitable control of the pressure and temperature ranges at which the method and apparatus is operated. The preformed bodies may be formed from sheet material in any suitable manner, as by die forming between mating dies; drape forming; pressure or vacuum forming, etc. As shown, the bodies designated 10 and 11 have a cup-like configuration and include face panels 12 and 12' and a marginal side wall 13, 13' formed of generally rectangular panels which extend around the periphery of the respective face panel. The cup-like bodies 10 and 11 have a peripheral flange 14, 14' at the free edge of the side walls and which flanges extend outwardly from the respective side wall. The cup-like bodies 10 and 11 are adapted to be joined together along the mating flanges 14, 14' to form a container and the container is provided with a filler opening 16 to enable filling of the container after the bodies are joined together and to also enable dispensing of the contents from the container. As shown, the filler opening 16 is located on the panel 12 of one of the cup-like bodies and the filler opening is disposed in a plane generally paralleling the plane of the respective flange 14. It is to be understood however, that the filler opening can be otherwise located on the container and may, for example, be located at the side wall of the container. The particular container herein shown also includes a handle portion 18 formed in the flanges 14, 14' adjacent one corner of the container.

The thermoplastic bodies, after preforming, frequently undergo some shrinkage and distortion during cooling and in the subsequent handling of the bodies prior to assembly of the same. This shrinkage and distortion affects the shape of the bodies in various different ways, and is most noticeable in bodies having generally rectangular side panels which can distort the flange out of its normal straight line position. Thus, the shrinkage and distortion frequently causes the side panels to bow inwardly from the undistorted dotted line condition shown in FIG. 4 to a distorted condition as shown in solid lines. In addition, the distortion of the containers frequently distorts the flanges such as 14, 14' out of the normal flat plane. Consequently, when the two cup-like bodies are thereafter assembled with their flanges together, the flanges on the containers are frequently laterally misaligned as shown in FIG. 7 and, further, the flanges on the two cup-like bodies may not contact each other at all points due to the aforedescribed distortion of the container flanges out of the normal planar condition.

The method and apparatus of the present invention reshapes the cup-like bodies during assembly of the same to assure proper registry and accurate mating and joining of the flanges on the cup-like bodies. In addition, the method and apparatus advantageously employs heat sealing to join the flanges together and is arranged to prevent further shrinkage or distortion of the cup-like bodies due to the heat applied during the heat sealing of the flanges and to inhibit creeping or separation of the heat softened flanges during heat sealing.

In accordance with the method of the present invention, the cup-like bodies are brought into opposed relation and, as the flanges on the open ends move into close proximity, each cup-like body functions to substantially close the open end of the other cup-like body. The flanges, however, on distorted cup-like bodies will not be in proper registry when the bodies are brought into opposed relation. In order to reform the bodies, a gaseous fluid such as air is introduced into the cup-like body through the filler opening and, as the flanges are brought into contact, they form at least a partial seal therebetween sufficient to allow the pressure in the container to build up and press the side walls outwardly. Shell confining members are positioned around the respective cup-like bodies and are shaped to extend closely adjacent the side walls of an undistorted body in the region adjacent the flange, to confine expansion of the side walls and thereby substantially equalize the shape of the open sides of the cup-like bodies. Advantageously, the flanges are thereafter clamped together to compensate for any distortion of the flanges out of the normal plane thereof, and to also hold the flanges on the two bodies in abutting relation. The flanges are preferably clamped together at their inner peripheries and are held in clamped relation during the subsequent heat sealing of the outer peripheral portions of the flanges to assure maintenance of the flanges in abutting registry during the heat sealing operation. In order to prevent "blow out" of the heat softened flanges, the internal air pressure in the containers is relieved after the flanges are clamped together and before the flanges are heat softened sufficient to effect a heat seal. If the body portions were heated above the heat distortion temperature thereof during heat sealing of the flanges, the body portions would further shrink and distort. Accordingly, the shell confining members are also advantageously employed to maintain the temperature of the thermoplastic bodies below the deformation temperature thereof, during the heat sealing operation. For this purpose, the shell confining members are also cooled during heat sealing. Advantageously, the flanges are held clamped between the shell confining members until after completion of the heat sealing operation to not only prevent distortion of the thermoplastic bodies but also to cool the heat sealed flange.

An apparatus suitable for practicing the method of the present invention is disclosed in the drawings and is an improvement in apparatus of the type disclosed in the patent to Mojonnier et al., No. 3,152,944 in general includes first and second article confining members designated 25 and 25', a heat sealing means preferably in the form of a pair of heat sealing jaws 26 and 26', a means 27 for introducing gaseous fluid at above ambient pressure into the container through the filler opening, and apparatus designated generally by the numeral 28 in FIG. 1 for controlling operation of the several devices in proper timed relation to effect introduction of air into the container before the container flanges are firmly clamped together and to relieve the fluid pressure in the container before the flanges are heat softened, to prevent blow out of the flanges.

The apparatus has a stationary support structure herein shown as including a base frame 35, a lower mounting plate 36, and an upper mounting plate 37 supported in fixed relation to the lower plate 36 as by standards or rods 38.

In the embodiment shown, the cup-like halves are of substantially the same size and the shell confining members are similarly shaped, it being understood that the method and apparatus is also adapted for use in assembling cup-like articles of relatively different shape and proportion, so long as the size of the open side of the articles is substantially the same to enable mating of the flanges. Since the shell confining members shown herein are similar, like numerals are used to designate corresponding parts. In general, the shell confining members are shaped to provide a frame which will closely surround a cup-like body in its undistorted condition in the region adjacent the flange and, preferably, the side wall designated 41 of the shell confining members is shaped to closely surround the undistorted shell not only in the region adjacent the flange but also at points spaced from the flange, as shown in the drawings. In addition, the shell confining members also preferably include an end panel or wall 42 arranged to closely overlie the end panel such as 12 of an undistorted cup-shaped body. The open ends of the shell confining members provide a lip portion which terminates in an edge 43 arranged to engage the flange on the shell to enable clamping of the shell flanges between adjacent shell confining members.

The shell confining members are mounted for movement toward and away from each other and as herein shown are operated by linear actuators 47 and 47', it being understood that any other suitable mechanism may be provided for moving the shell confining members into and out of position around the container. The linear actuators 47 and 47' are mounted on generally U-shaped supports 48 and 48' carried by the plates 37 and 36 respectively. The actuators are similarly constructed and each actuator includes a piston rod 49 connected through a cross head 51 and rods 52 to plates 53, 53', which support respective ones of the shell confining members 25, 25'. In the embodiment shown, the linear actuators are the single acting air operated type which are normally urged to their retracted position shown in FIG. 1 as by a spring (not shown) and which are urged to their extended position shown in FIGS. 5 and 6 in response to the application of fluid pressure to a pressure line designated 55 and 55' respectively. As shown in FIGS. 1, 5 and 6, rods 52 extend through guide bores 57 in the respective support plates 37 and 36 and are laterally stabilized thereby.

The heat sealing jaws 26 and 26' are dimensioned to extend around the respective shell confining members 25 and 25' and to engage and heat seal the flange portions outwardly of the shell confining members. The heat sealing jaws shown herein comprise generally rectangular frames designated 65 and 65' having heating elements 66 therein, and which heat sealing jaws are supported on plates 67 and 67' respectively. As shown in FIG. 2, the plates 67, 67' are conveniently guidably supported on the support rods 38 as by bushings 70. The heat sealing jaws are also selectively moved toward and away from each other and, as shown, are operated by linear actuators 71 and 71', it being understood that other suitable means may be provided for moving the heat sealing jaws. The linear actuators 71 and 71' are respectively supported on the plates 37 and 36 and each include a cylinder and a piston rod 72 extending out of the cylinder and operatively connected to the respective one of the heat sealing jaws. The actuators 71 and 71' are also conveniently of the single acting type which are normally urged to a retracted position as shown in FIG. 1, as by a spring (not shown) and are pressure operated to an extended position as shown in FIGS. 5 and 6 in response to the application of fluid pressure to the pressure lines is 75 and 75'.

One of the shell confining members such as member 25 has a recess or opening 81 arranged to register with and accommodate the filler opening or spout 16 on the container, when the shell confining members extend therearound. The apparatus for introducing gaseous fluid under above ambient pressure into the containers includes a head designated 82 arranged to substantially sealingly engage the container around the filler opening 16, when the shell confining members are in position therearound and, as shown, the head 82 is in the form of a tapered plug adapted to extend into the filler opening. Alternatively, the head may be shaped to form a face type seal with the container around the filler opening, if desired.

The head 82 is moved into engagement with the container to form a seal therewith and allow introduction of air into the container before the container flanges 14, 14' are firmly clamped together, to thereby allow the internal air pressure to move the side walls 13, 13' of the thermoplastic bodies outwardly and into engagement with the shell confining members. Although a separate apparatus may be provided for moving the head into and out of engagement with the containers, it is convenient, when the filler opening 16 is disposed in a plane generally parallel to the plane of the flanges as shown in the present embodiment, to mount the head 82 for movement with one of the shell confining members 25, so that the head automatically engages the filler opening in the container as the shell confining member is moved into position around the container. In addition, the head is supported for limited lost motion relative to the shell confining member so as to allow the shell confining member to move downwardly into engagement with the flange, after the head has formed a seal with the container around the filler opening. As shown, the head 82 is attached to an elongated vertically extending tube 85 which extends upwardly through openings 86 and 87 in the jaw mounting plate 67 and upper support plate 87 respectively. The rod 85 slidably extends through a bracket 88 attached to one of the rods 52 for moving the shell confining member 25. The bracket 88 is conveniently adjustably mounted on the rod 52 and is arranged to engage or underlie a shoulder such as the cap 89 at the end of the tube 85 to normally limit downward movement of the head 82 to a position in which the head will engage the container around the filler opening before the edge 43 of the shell confining member 25 engages the flange. The tube 85, however, is slidable upwardly relative to the bracket 88, to allow the head to shift upwardly after engagement with the container, and during continued downward movement of the shell confining member 25. Thus, the head 82 is yieldably urged downwardly by gravity and may be weighted or spring loaded to hold the head in engagement with the container, with sufficient force to prevent unseating of the head from the container, at least until the desired pressure is built up in the container. As will be noted, when the head 82 engages the upper shell it applies a yieldable pressure on the upper shell in a direction to press the upper shell down against the lower shell and thus tends to press the flanges on the shells into abutting contact before the shell flanges are clamped between the shell confining members.

The heat sealing jaws 65 may be heated in various ways and, in the embodiment shown, are heated by an electrical heating element 66 disposed in the jaws adjacent their outer heat sealing face 26a. In order to prevent further distortion or deformation of the container during heat sealing of the flanges, provision is made for cooling the shell confining members to maintain the temperature of the thermoplastic bodies below the distortion temperature thereof during the heat sealing operation. In the embodiment shown, the mounting plates 53 and 53' are also adapted to function as cooling plates and are formed with coolant passages 91 therein adapted to have a cooling fluid such as water or the like pass therethrough to cool the shell confining members. Coolant such as water may be supplied to the passages 91 in any suitable manner and, as diagrammatically shown in FIG. 1, the passages are connected through conduits 92 to a coolant source 98. A thermostatically controlled apparatus (not shown) may be provided and operated in accordance with the temperature of the shell confining members to regulate the flow of coolant and maintain the temperature of the shell confining members sufficiently low to prevent heat distortion of the container during heat sealing. In order to inhibit build up of temperature in the structure associated with the heat sealing jaws, the latter are also preferably cooled and, as shown, are provided with coolant passages 96 connected through lines 97 to the coolant source 98 to have a cooling fluid pass therethrough. If desired, the coolant can be passed serially through the passages 91 in the shell confining members and then through the passages 96 in the heat sealing jaws. Any suitable means may be provided for connecting the movable cooling plates 53, 53' and 96, 96' to the coolant source.

The preformed thermoplastic bodies can be arranged in opposed relation and positioned between the shell confining members in any desired manner, either manually or automatically by suitable apparatus (not shown). For example, the cup-like bodies can be arranged in opposed relation and then deposited in one or the other of the shell confining members, and the shell confining members then moved toward each other to enclose the thermoplastic bodies and finally grip the flanges therebetween. An alternative arrangement is shown in the drawings and includes retractable support elements 101 which are arranged to engage the flanges on the thermoplastic bodies and loosely support the same in position between the shell confining members. A mechanism (not shown) is provided for automatically retracting the container supports 101 when the shell confining members are moved into a position around the container.

Any suitable mechanism may be provided for controlling operation of the shell confining members, heat sealing jaws and pressure applying apparatus in timed relation to effect introduction of gaseous fluid under pressure into the containers before the shell confining members firmly clamp the flanges together, and to thereafter clamp the flanges between the shell confining members and relieve the fluid pressure in the container before the flanges are heat softened. One apparatus suitable for operating the linear fluid actuators 47, 47' and 71, 71' is diagrammatically illustrated in FIG. 1. As diagrammatically shown, valves 111, 112 and 113 are respectively provided for controlling actuation of the shell confining members; the heat sealing jaws; and the application of air pressure through the head 82. The valves are operated in timed relation with each other by a sequence control mechanism 115. In the embodiment shown, a second valve 110 is provided for controlling the actuation of the shell confining members somewhat in step-fashion to first move the shell confining members into position around the thermoplastic bodies and to thereafter clamp the flanges between the shell confining members.

The valves 110–113 are conveniently of similar construction and each have an inlet designated by the letter *a*, a pressure outlet designated by the letter *b*, an exhaust outlet designated by the letter *c*. In addition, the valves have pilot controls designated by the letters *d* and *e* which are operative when pressure is relieved at the pilot control *d* to move the valve to a position communicating the pressure line *b* with the inlet *a* and operative when pressure is relieved at the pilot *e* to move the valve to a position communicating the pressure outlet *b* with the exhaust *c*.

The inlets *a* of the valves 110 and 111 are connected through respective regulators 115 and 116 to a source of air pressure 117. The outlets *b* of valves 110 and 111 are connected through the pressure lines 55 and 55' to the cylinders 47 and 47' for actuating the container confining members. The valve 110 is arranged to apply a relatively low pressure to the actuating cylinders 47 sufficient to move the shell confining members into position around the thermoplastic bodies, but insufficient to clamp the flanges together against lateral movement under the internal air pressure, and the regulator 115 is adjusted accordingly. Valve 111 is arranged to apply relatively higher clamping pressure to the shell confining members sufficient to firmly clamp the flanges together and hold the same against lateral movement. The pilot controls *d* and *e* of valves 110 and 111 are operated under the control of suitable cams on the sequence control apparatus 115, and which cams control exhausting of fluid from the pilots *d* and *e* of the valves to sequentially apply low pressure through the valve 110 to the cylinders to move the shell confining members into position around the containers, and to thereafter apply relatively higher pressure through valve 111 to firmly clamp the flanges together. For reasons pointed out hereinafter, the valves 110 and 111 are maintained in their pressure applying position until after the completion of the heat sealing operation.

The valve 113 is connected through a regulator 118 to the source of fluid supply 117 and has its outlet connected through a line 119 to the pressure applying head 82. The regulator 118 is adjusted to apply a relatively low pressure for example, of the order of three to five pounds to the container, when the valve 113 is opened. The timing of operation of the valve 113 is advantageously selected so as to apply air to the head 82 and hence to the containers as the shell confining members 25 move into position around the container, and before the flanges are firmly clamped together. Thus, in the two step closing of the shell confining members achieved by low pressure valves 110 and the high pressure valve 111, the valve 113 is preferably operated to supply air to the containers after the low pressure valve is opened and before the high pressure valve 111 is opened to clamp the flanges together. The valve 113 can, of course, be opened earlier, but this would produce an unnecessary consumption and waste of compressed air. Alternatively, the low pressure valve 110 can be omitted and the shell confining members moved only under the control of the high pressure valve 111. With this later arrangement, air must be supplied to the containers before the shell confining members reach their clamping position. Thus, the valve 113 should be turned on when the shell confining members 25 and 25' reach a preselected distance, such as one-half inch apart and, as they approach a position such as shown in FIG. 7, the shell confining members move the container flanges toward each other and at least partially seal off the space between the flanges. At that time, the air pressure in the containers rapidly builds up sufficient to push the side walls 13, 13' thereof outwardly as shown in FIG. 8. As the shell confining members continue movement toward each other, they reach the position such as shown in FIG. 5 in which the shell confining members firmly clamp the flanges therebetween and hold the same in a position with the outer portions of the flanges projecting outwardly of the shell confining members. The valve 113 is thereafter operated to its exhaust position to relieve the air pressure in the container before the flanges are completely heat sealed. Valve 112 which controls the hot jaws is connected through a regulator 125 to the source of supply and is connected through lines 126 to the pressure lines 75 of the hot jaw actuators. Valve 112 is operated under the control of cams on the sequence control mechanism to close the hot jaws and heat seal the same after the flanges are clamped between the container confining members. Thereafter, valve 112 is operated to open the hot jaws while the container confining members 25, 25' remain in clamping position against the flanges, and the container confining members are thereafter retracted.

In order to effect reliable heat sealing of the flanges, the thermostats 120, 120' for the hot jaws are adjusted to maintain the jaw temperatures substantially above the softening temperature of the plastic about 275° F. for high impact polystyrene and polyethylene. It has been found, however, that the heat sealing can be achieved in a shorter time and without contamination of the hot jaws due to building of plastic thereon, if the jaw temperature is maintained above the melting temperature of the plastic to thereby cause the outer peripheral portions of the flanges to fuse and flow together to form an integral joint. High density polyethylene, for example, have a compression molding temperature in the range of about 300° F. and become fluid in that temperature range. The jaws are preferably maintained at a temperature above the melting temperature and in the range 550° to 600° for high density polyethylene to rapidly heat the shell flanges and to melt and vaporize any plastic which adheres to the hot jaws when they are retracted. When the jaws are maintained at these elevated temperatures, special jaw coatings are not required to avoid contamination of the hot jaws. It has instead been found that when the jaws are heated to these elevated temperatures, plain polished jaws can be used without sticking or accumulation of plastic, provided they are of a material such as stainless, which steel does not oxidize or corrode readily or are plated and polished to provide a smooth non-oxidizing surface.

The shell confining members are maintained at a temperature substantially below the heat distortion temperature of the plastic. High density polyethylene begins to distort at about 250° F. and the cooling jacket temperature is accordingly maintained well below this heat distortion temperature. The timing of the apparatus is so arranged that the hot jaws are maintained in engagement with the flanges for an interval sufficient to soften and effect fusion of even relatively thick flanges on the preformed bodies. In practice, it has been found that heating of the flanges for periods somewhat longer than the minimum required to soften and seal the same, does not result in unsatisfactory seals and that the time interval during which the jaw assemblies are closed can be varied over a relatively wide range without adversely affecting the character of the seal.

The shell confining members not only clamp the flange together and hold the containers in their reformed or expanded condition when the internal air pressure is relieved, but also press the flanges firmly together to overcome distortion of the bodies in the plane of the flanges. Further, the shell confining members protect the thermoplastic bodies from the hot jaws to prevent heat distortion and operate to strip the flanges from the hot jaws when the latter are retracted. In addition, the shell confining members function to rapidly cool the flanges aftr retraction of the hot jaws, to thereby inhibit creeping or separation of the heat softened flanges.

I claim:

1. In the method of joining preformed cup-like shells of thin thermoplastic material having out-turned flanges at the open ends thereof, the shells forming a container having a filler opening when the shells are joined at their flanges, the steps of bringing the flanges on the shells into abutting contact to substantially close the open ends of the shells and thereafter firmly clamping flanges on the shells together, introducing gaseous fluid at above ambient pressure through the filler opening into the shells before the flanges are firmly clamped together to press the sides of the shells outwardly, engaging the outside of the shells in the region adjacent the flanges to confine expansion of the shells to a shape corresponding generally to the shape of an undistorted shell, heat softening the flanges on the shells while they are firmly clamped together to join the same, and releasing the pressure on the fluid in the shells before the flanges are heat softened and while retaining the sides of the shells in said shape.

2. In the method of joining preformed cup-like shells of thin thermoplastic material having out-turned flanges at the open ends thereof, the shells forming a container having a filler opening when the shells are joined at their flanges, the steps of enclosing each shell in the region adjacent the respective flanges in a rigid frame shaped to extend closely around an undistorted shell adjacent the flange thereon, bringing the flanges on the shells into abutting contact to substantially close the open ends of the shells, introducing gaseous fluid at above ambient pressure into the shells through the filler opening to press the sides of the shells outwardly into engagement with the respective frame to thereby reshape the sides of the shells in a preselected shape conforming to the respective frame, thereafter clamping the flanges of the shells together between the frames to hold the sides of the shells in said preselected shape, heat softening the flanges to join the shells, and releasing the pressure on the fluid in the shells before the flanges are heat softened sufficient to seal.

3. In the method of joining preformed cup-like shells of thin thermoplastic material having out-turned flanges at the open ends thereof, the shells forming a container having a filler opening when the shells are joined at the flanges, the steps of enclosing the shells in the region adjacent the respective flange in a hollow shell confining member shaped to closely surround an undistorted shell in the region adjacent the flange on the shell, bringing the flanges on the shells into abutting contact to substantially close the open ends of the shells, introducing gaseous fluid at above ambient pressure into the shells through the filler opening to press the sides of the shells outwardly until the sides of the shells engage the respective hollow shell confining member with the flanges projecting outwardly between the members, thereafter clamping the inner peripheral portions of the mating flanges between the members to hold the sides of the shells in their outwardly pressed condition, heat softening the outer peripheral portions of the mating flanges sufficient to seal the same together, and releasing the pressure inside the shells before the flanges are heat softened sufficient to seal.

4. In the method of joining preformed cup-like shells of thin thermoplastic material having out-turned flanges at the open ends thereof, the shells forming a container having a filler opening when the shells are joined at the flanges, the steps of enclosing the shells in the region adjacent the respective flange in a hollow shell confining member shaped to closely surround an undistorted shell in the region adjacent the flange on the shell, bringing the flanges on the shells into abutting contact to substantially close the open ends of the shells, introducing gaseous fluid at above ambient pressure into the shells through the filler opening to press the sides of the shells outwardly until the sides of the shells engage the respective hollow shell confining member with the flanges projecting outwardly between the members, thereafter clamping the inner peripheral portions of the mating flanges between the members to hold the sides of the shells in their outwardly pressed condition, heating the outer peripheral portions of the mating flanges sufficient to heat seal the same together, releasing the pressure inside the shells before the flanges are heat softened sufficient to seal, and maintaining the temperature of the hollow shell confining members substantially below the temperature at which distortion of the plastic occurs to prevent distortion of the shells during heat sealing.

5. In the method of joining preformed cup-like shells of thin thermoplastic material having out-turned flanges at the open ends thereof, the shells forming a container having a filler opening when the shells are joined at the flanges, the steps of enclosing the shells in the region adjacent the respective flange in a hollow shell confining member shaped to closely surround an undistorted shell in the region adjacent the flange on the shell, bringing the flanges on the shells into abutting contact to substantially close the open ends of the shells, introducing gaseous fluid at above ambient pressure into the shells through the filler opening to press the sides of the shells outwardly until the sides of the shells engage the respective hollow shell confining member with the flanges projecting outwardly between the members, thereafter clamping the inner peripheral portions of the mating flanges between the members to hold the sides of the shells in their outwardly pressed condition, bringing opposed heat-sealing jaws into engagement with the outer peripheral portions of the mating flanges and heating at least one of the jaws to a temperature sufficient to heat seal the flanges together, and releasing the pressure inside the shells before the flanges are heat sealed.

6. In the method of joining preformed cup-like shells of thin thermoplastic material having out-turned flanges at the open ends thereof, the shells forming a container having a filler opening when the shells are joined at the flanges, the steps of enclosing the shells in the region adjacent the respective flange in a hollow shell confining member shaped to closely surround an undistorted shell in the region adjacent the flange on the shell, bringing the flanges on the shells into abutting contact to substantially close the open ends of the shells, introducing gaseous fluid at above ambient pressure in the shells through the filler opening to press the sides of the shells outwardly until the sides of the shells engage the respective hollow shell confining member with the flanges projecting outwardly between the members, thereafter clamping the inner peripheral portions of the mating flanges between the members to hold the sides of the shells in their outwardly pressed condition, bringing opposed heat sealing jaws into engagement with the outer peripheral portions of the mating flanges and heating at least one of the jaws to a temperature sufficient to heat seal the flanges together, releasing the pressure inside the shells before the flanges are heat sealed and thereafter moving the heat sealing jaws away from the flanges while maintaining the shell confining members in clamping engagement with the flanges to strip the flanges from the sealing jaws.

7. In the method of joining preformed cup-like shells of thin thermoplastic material having out-turned flanges at the open ends thereof, the shells forming a container having a filler opening when the shells are joined at the flanges, the steps of enclosing the shells in the region adjacent the respective flange in a hollow shell confining member shaped to closely surround an undistorted shell in the region adjacent the flange on the shell, bringing the flanges on the shells into abutting contact to substantially close the open ends of the shells, introducing gaseous fluid at above ambient pressure into the shells through the filler opening to press the sides of the shells outwardly until the sides of the shells engage the respective hollow shell confining member with the flanges projecting outwardly between the members, thereafter clamping the inner peripheral portions of the mating flanges between the members to hold the sides of the shells in their outwardly pressed condition, bringing opposed heat sealing jaws into engagement with the outer peripheral portions of the mating flanges and heating at least one of the jaws to a temperature sufficient to heat seal the flanges together, releasing the pressure inside the shells before the flanges are heat sealed, moving the heat sealing jaws away from the flanges while maintaining the shell confining members in clamping engagement with the flanges to strip the flanges from the sealing jaws, and maintaining the temperature of the hollow shell confining members substantially below the temperature at which distortion of the plastic occurs to prevent distortion of the shells during heat sealing.

8. An apparatus for joining preformed cup-like shells of thin thermoplastic material having mating out-turned flanges at their open ends, the shells forming a container having a filler opening when the shells are assembled, said apparatus comprising, a pair of hollow shell confining members each dimensioned to extend closely around an undistorted shell in the region adjacent the shell flange, means for moving the shell confining members toward each other to a position surrounding the respective shells adjacent the flanges and clamping the flanges on the shells in abutting contact, a head operative to sealingly engage the filler opening in the container shells when the shell confining members surround the shells, means controlling application of fluid pressure to said head operative to introduce gaseous fluid at above ambient pressure into shells before the shell confining members move into clamping engagement with the flanges and to release the pressure in the shells after the flanges are clamped together, a pair of heat sealing jaws extending around the shell confining members and engageable with the shell flanges outwardly of the shell confining members, means for moving the heat sealing jaws into engagement with the flanges after the flanges have been clamped together, and means for heating at least one of said jaws sufficient to heat soften the flanges to seal the same together.

9. An apparatus for joining preformed cup-like shells of thin thermoplastic material having mating out-turned flanges at their open ends, the shells forming a container having a filler opening when the shells are assembled, said apparatus comprising, a pair of opposed shell confining members each having a marginal lip portion dimensioned to extend closely around the periphery of an undistorted shell and shaped to engage the inner peripheral portion of the shell flange, a pair of heat sealing jaws extending around said shell confining members and engageable with the outer peripheral portion of shell flange, means for moving said pair of shell confining members and said pair of heat sealing jaws toward and away from each other, means engageable with the filler opening in the container for introducing gaseous fluid at above ambient pressure into the shells, means for operating said pressure introducing means in correlated relation with the movement of said shell confining members to apply pressure to the shells before the flanges on the shells are firmly clamped between the lip portions of opposed shell confining members and for relieving the pressure in the shells after the flanges are clamped between the lip portions on opposed shell confining members and before the hot jaws soften the flanges sufficient to heat seal the same.

10. An apparatus for joining preformed cup-like shells of thin thermoplastic material having mating out-turned flanges at their open ends, the shells forming a container having a filler opening when the shells are assembled, said apparatus comprising, a pair of opposed shell confining members each having a marginal lip portion dimensioned to extend closely around the periphery of an undistorted shell and shaped to engage the inner peripheral portion of the shell flange, a pair of heat sealing jaws extending around said shell confining members and engageable with the outer peripheral portion of shell flange, means for moving said pair of shell confining members and said pair of heat sealing jaws toward and away from each other, means engageable with the filler opening in the container for introducing gaseous fluid at above ambient pressure into the shells, means for operating said pressure introducing means in correlated relation with the movement of said shell confining members to apply pressure to the shells before the flanges in the shell are firmly clamped between the lip portions of opposed shell confining members and for relieving the pressure in the shells after the flanges are clamped between the lip portions on opposed shell confining members and before the hot jaws soften the flanges sufficient to heat seal the same, and means for cooling said shell confining members sufficient to maintain the temperature of the shells below the distortion temperature thereof.

11. The combination of claim 9 wherein said means engageable with the filler opening includes a head operatively connected to one of the shell confining members for movement into engagement with the filler opening in the container.

12. The combination of claim 9 wherein each said shell confining member and the associated heat sealing jaw is supported for independent movement, and separate means are provided for moving each shell confining member and the heat sealing jaw associated therewith.

References Cited

UNITED STATES PATENTS

| | | | |
|---|---|---|---|
| 3,053,726 | 9/1962 | Larson et al. | 156—304 |
| 3,141,196 | 7/1964 | Langecker | 264—96 X |
| 3,152,944 | 10/1964 | Mojonnier et al. | 156—498 |
| 3,160,999 | 12/1964 | Lee | 53—39 |
| 3,216,874 | 11/1965 | Brown | 156—69 |

EARL M. BERGERT, *Primary Examiner.*

M. L. KATZ, *Assistant Examiner.*